May 16, 1967 C. L. AUERNHEIMER 3,320,365
SELF-BIASING AMPLIFIER
Filed June 8, 1964
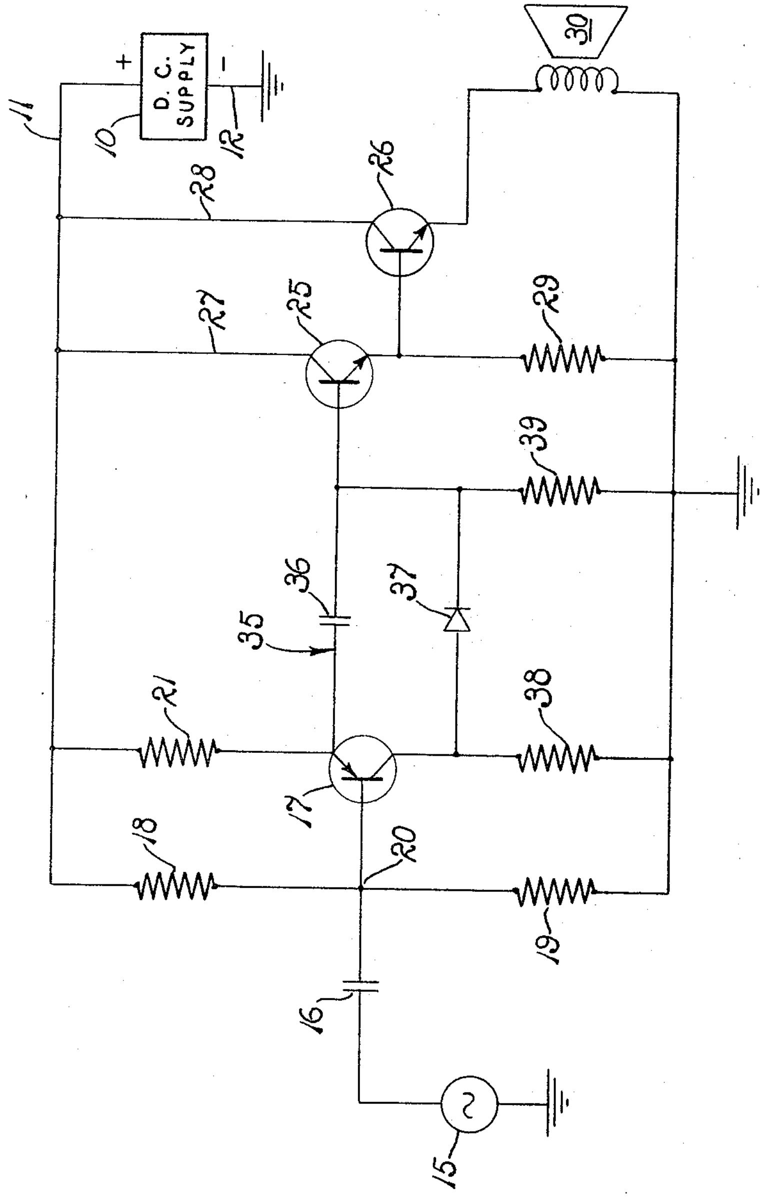
CLARENCE L. AUERNHEIMER
INVENTOR
Huebner & Worrel
ATTORNEYS United States Patent Office 3,320,365
Patented May 16, 1967

3,320,365

SELF-BIASING AMPLIFIER

Clarence L. Auernheimer, Fresno, Calif., assignor to A. V. Electronics, Inc., Fresno, Calif., a corporation of California Filed June 8, 1964, Ser. No. 373,174
5 Claims. (Cl. 179—1)

This invention relates to an improved self-biasing amplifier employing transistors in its circuitry. It particularly relates to an improved biasing circuit in such an amplifier which precludes the possibility of thermal runaway and minimizes current drain from the power supply, so that current is required only during amplification of excitation signals.

Conventional class A operated amplifiers continuously draw current from the power supply, and such current drain is independent of any input excitation signal. This is particularly disadvantageous when the power supply is in the form of a small dry-cell battery, such as that employed in portable radios, hearing aids, and other signal amplifiers of compact design. In many of such amplifiers, a continuous power drain during periods of no signal excitation is approximately one-half of the power required during signal amplification. In the case of a hearing aid, actual signal amplification utilizes only a minor portion of total current required from the power supply during a given period of operation. Accordingly, the advantage of power supply conservation has led to the design of transistor amplifiers wherein the power supply drain is determined by the amplitude of the excitation signal.

An example of such an amplifier is that disclosed in United States Patent No. 3,035,233 issued to R. C. Heyser. Experimental and design analysis of the amplifier disclosed in the Heyser patent indicates that under certain operating conditions the biasing circuit employed therein tends to raise the level of quiescent current flowing through the power transistors and thereby represents a possible current drain on a power supply. This current drain is usually intermittent, but frequently is continuous, even though excitation signals have terminated. The level of quiescent current has been found to fluctuate, dependent upon the amplitude of the excitation signal previously applied to the amplifier, since the biasing circuit does not insure that the power transistors are properly biased to a non-conductive, or cut-off, level. Consequently, when such a condition exists in the power transistors, the intermittent, and sometimes continuous, current drain on the power supply results in a shortened service life of the power supply, such as conventional dry-cell batteries.

In addition to the aforementioned undesirable current drain, input signals of an abnormally high amplitude tend to produce a condition known as thermal runaway in the power transistors employed in such an amplifier. Consequently, when an excessive quantity of current flows through a load, such as the voice coil of the speaker of the amplifier, it represents an excessive current drain, as well as a detrimental factor in the expected service life of the voice coil. If such a condition persists, voice coil burn-out and/or failure of one or more of the power transistors will result.

Accordingly, it is an object of the present invention to provide a transistor amplifier which incorporates a self-biasing circuit to preclude thermal runaway.

Another object is to provide a self-biasing circuit in a transistor amplifier which insures a biasing of power transistors to a cut-off level during periods of no signal excitation.

Another object is to provide a transistor amplifier having a self-biasing circuit responsive to the amplitude of the input signal and consequently minimizes power supply drain during periods of no signal.

Another object is to provide a transistor amplifier which greatly extends the service life of batteries employed as a power supply.

Another object is to provide a transistor amplifier capable of class A operation without using large amounts of supply power, and yet precludes voice coil damage during operation.

A further object is to provide a transistor amplifier adaptable for use in hearing aids and the like which are utilized only intermittently for signal amplification.

A still further object is to provide an amplifier of simple design, capable of employing commercially available components, and extremely efficient in power utilization.

These, together with other objects, will become more fully apparent upon reference to the following description and accompanying drawing.

In the drawing:

The single figure is a circuit diagram of a transistor amplifier embodying the principles of the present invention.

Referring to the drawing, a source of D.C. operating potential 10 provides power for the amplifier through a conductor 11 connected to the positive electrode and a conductor 12 connected between the negative electrode and a common ground. A signal source 15 provides signals through a coupling capacitor 16 to a preamplifier transistor of the PNP type and having base, emitter, and collector elements. A voltage divider is connected across the source of operating potential and includes biasing resistors 18, 19 connected at a junction 20. The base of transistor 17 is connected to the junction 20 to establish a bias level for the transistor, as well as to receive signals through capacitor 16 from the source 15. A load resistor 21 is connected between the operating potential and the emitter of transistor 17.

A first output transistor 25 is connected in emitter follower relation to a second output transistor 26. Both of these output transistors are of the NPN type and each provide respective base, emitter and collector elements. Branch conductors 27 and 28 individually connect the respective collectors of output transistors 25 and 26 with the source of operating potential. The emitter of transistor 25 is connected to the grounded side of the source of operating potential through a resistor 29, and is also connected to the base of transistor 26. The emitter of the second output transistor 26 is connected to the common ground through the voice coil of a loud speaker 30.

A biasing network 35 interconnects the preamplifier transistor 17 and the first output transistor 25 and is connected to the source of operating potential through the common ground and load resistor 21. The network includes a capacitor 36 having one side connected to the emitter of preamplifier transistor 17 and the other side connected to the base of the first output transistor 25. A semiconductor diode 37 has one side connected to the collector of transistor 17 and is provided with a polarity so that current flow through transistor 17 due to input signals is not impeded by diode 37. The other side of the diode is connected to the other side of capacitor 36 and also to the base of the first output transistor 25.

A first biasing resistor 38 is connected between the source of operating potential and one side of the diode 37, and a second biasing resistor 39 is connected between said source and the opposite side of the diode. The biasing resistors 38 and 39 in conjunction with the conductors interconnecting the diode 37 to the source of operating potential through the resistors constitutes a resistance circuit for the biasing network.

Typical values for the various components of the amplifier shown in the circuit diagram are as follows:

| Description: | Typical values |
|---|---|
| D.C. supply 10 | 24 volts. |
| Signal source 15 | As required. |
| Capacitor 16 | 10 mfd./25 v. |
| Preamplifier transistor 17 | PNP. |
| Biasing resistor 18 | 100K. |
| Biasing resistor 19 | 33K. |
| Load resistor 21 | 4.7K. |
| Output transistor 25 | NPN. |
| Output transistor 26 | NPN. |
| Resistor 29 | 4.7K. |
| Speaker 30 | 4–8 ohms. |
| Capacitor 36 | 10 mfd./25 v. |
| Diode 37 | Any germanium or silicon diode. |
| Biasing resistor 38 | 1000 ohms. |
| Biasing resistor 39 | 33K. |

*Operation*

The operation of the described embodiment of the subject invention is believed to be readily apparent and is briefly summarized at this point. It will be noted that the base of transistor 25 is connected to the junction between capacitor 36 and diode 37. Any bias voltage applied to the base of transistor 25 is also applied to the second output transistor 26 by reason of the emitter follower relation of the transistors and the potential drop is minimal so that it may be disregarded. Therefore, any bias which is applied to the base of transistor 25 to bring it to a current conductive state will also be applied to transistor 26 and likewise render it conductive.

During periods of signals emanating from source 15 and applied to the base of the preamplifier transistor 17 so as to render it conductive, the polarity of diode 37 will permit current to be conducted through transistor 17 and applied to the base of transistor 25 and likewise render it conductive. Consequently, output transistor 26 is likewise rendered conductive so that an amplified signal is directed through the voice coil of speaker 30.

During periods of no signal reception from the source 15, the biasing network insures that the transistor 25 is biased to a cut-off, or non-conducting, level by reason of the resistors 38 and 39 and the polarity of diode 37. Consequently, the output transistors 25 and 26 are at all times biased below a cut-off level and thereby preclude any current drain from the source 10 during non-amplifying periods. In amplifiers used at infrequent intervals, such as hearing aids and the like, this biasing of the output transistors below a cut-off level extends greatly the life of the power supply.

In addition to extension of power supply life, the biasing network prevents thermal runaway of the output transistors 25 and 26, which might otherwise occur. Under conditions of a constant current drain during a quiescent period wherein the output transistor 25 was not biased below a cut-off level, an input signal of extremely high amplitude would cause an unusually high current to be conducted through the output transistors 25 and 26. It is not unusual that such an abnormally high amplitude of input signal will introduce a condition known as thermal runaway in the power transistors so that an excessive quantity of current flows through the voice coil of the speaker 30, which represents the load.

If such a condition were to persist, the voice coil would burn out and/or cause failure of one or more of the power transistors. In an amplifier embodying the present invention, the biasing network 35 precludes thermal runaway of the output transistors while also conserving the power supply. Consequently, the invention extends the service life of all components employed in the amplifier.

While the circuit diagram illustrates the preamplifier transistor 17 as being a PNP type and the output transistors 25 and 26 as the NPN type, the polarity of these transistors as well as the source of operating potential and the diode 37 can readily be reversed by those skilled in the art.

Accordingly, the invention provides a signal biased transistor amplifier which minimizes power drain and incorporates a biasing network to preclude damage to the output transistors and/or the voice coil of the loud speaker. The biasing network is effective at all times during periods of no signal excitation to insure biasing of the output transistors to a cut-off, or non-conducting, level so as to conserve the power supply, and yet permit normal Class A operation during signal amplification.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A self-biased amplifier including a first transistor having emitter and collector elements, a power transistor having a base and emitter elements, a capacitor connected between said first transistor emitter and said power transistor base, a single semiconductor diode, means connecting said diode in current conductive current flow direction with said first transistor collector, means connecting said diode in a reverse conductive current flow direction to the base of said power transistor and said capacitor, and biasing resistance means connected between a source of biasing voltage and respective opposite sides of said diode for biasing said first transistor below a cut-off level and thereby prevent current output therethrough.

2. A self-biased transistor amplifier including a preamplifier transistor and a power transistor, each of said transistors having emitter, base and collector elements, means for applying input signals to said preamplifier transistor base, a load resistor connected to said preamplifier transistor emitter, a capacitor connected between said preamplifier transistor emitter and said power transistor base, a diode connected at one end in a forward conductive current flow direction with said preamplifier transistor collector, means connecting the opposite end of said diode in a reverse conductive current flow direction to the base of said power transistor and said capacitor, a source of operating potential, and a pair of biasing resistors respectively individually connecting the opposite ends of said diode to said source of operating potential in a biasing resistance circuit for biasing said power transistor below a cut-off level and thereby prevent current output therethrough.

3. In an amplifier having a source of operating potential and two cascaded stages wherein input signals are applied to a preceding one of said stages, a biasing network connected between said stages and comprising a capacitor having one side connected to the output of said preceding stage to receive signals therefrom, a single semiconductor diode means having one side connected to the preceding stage with a polarity not to impede current flow therethrough due to input signals, means connecting the other side of said diode to the other side of said capacitor and to the other of said cascaded stages, a resistance circuit consisting of a pair of resistors having respective resistance values, and conductor means individually and solely connecting said resistors between said source of operating potential and respective opposite ends of said diode.

4. A self-biased transistor amplifier comprising a source of operating potential; a preamplifier transistor having base, emitter and collector elements; a voltage divider connecting said source of potential and the base of the preamplifier transistor; a source of input signals connected to the base of the preamplifier transistor; a pair of output transistors having respective base emitter and collector elements wherein said transistors are connected in emitter follower relation; means respectively connecting the collectors of said output transistors with said source of operating potential; a loud speaker connected across the emitter of said second output transistor and said source of operating potential; a capacitor having one side connected to the emitter of said preamplifier transistor; a semiconductor diode having one side connected to the collector of said preamplifier transistor with a polarity not to impede current flow therethrough due to input signals; conductor means connecting the other side of said diode to the other side of said capacitor and to the base of said first output transistor; and a resistance circuit connected to said source of operating potential at opposite ends of said diode.

5. The self-biased transistor amplifier of claim 4 wherein said resistance circuit includes a pair of resistors having respective values, and means individually connecting said resistors between said source of operating potential and respective opposite ends of said diode.

References Cited by the Examiner

UNITED STATES PATENTS 3,035,233 5/1962 Heyser -------------- 330—24

FOREIGN PATENTS 691,723 5/1940 Germany.

OTHER REFERENCES

Brown et al.: Latching Threshold Detector, pages 45–46, IBM Tech. Disclosure, vol. 24, No. 2, July 1961.

ROY LAKE, *Primary Examiner.*

E. C. FOLSOM, *Assistant Examiner.*